United States Patent [19]
Ohori

[11] Patent Number: 5,253,929
[45] Date of Patent: Oct. 19, 1993

[54] BRAKE CONTROL SYSTEM OF ELECTRIC VEHICLE

[75] Inventor: Harumi Ohori, Toyota, Japan

[73] Assignee: Toyota Jidosha Kabushiki Kaisha, Toyota, Japan

[21] Appl. No.: 991,125

[22] Filed: Dec. 16, 1992

[30] Foreign Application Priority Data

Dec. 20, 1991 [JP] Japan .................................. 3-338545
Dec. 20, 1991 [JP] Japan .................................. 3-338976

[51] Int. Cl.$^5$ .............................................. B60T 13/74
[52] U.S. Cl. ...................................... 303/3; 188/156;
188/159; 188/181 T; 303/15; 303/DIG. 3;
303/112
[58] Field of Search ............... 303/3, 15, 2, 20, 13-18,
303/DIG. 3, 112; 188/156, 158, 159, 106 P,
161-165, 181 T

[56] References Cited

U.S. PATENT DOCUMENTS

| 4,181,366 | 1/1980 | Dobner | 303/3 |
| 4,425,005 | 1/1984 | Warwick | 188/159 X |
| 4,671,576 | 6/1987 | Fourie | 188/156 X |
| 4,671,577 | 6/1987 | Woods | 303/3 |
| 4,962,969 | 10/1990 | Davis | 303/3 |

FOREIGN PATENT DOCUMENTS 63-29301 2/1988 Japan .
64-43001 2/1989 Japan .

*Primary Examiner*—Douglas C. Butler
*Attorney, Agent, or Firm*—Cushman, Darby & Cushman

[57] ABSTRACT

A brake control system mounted in an electrical vehicle for controlling a hydraulic brake and a regenerative brake. The hydraulic brake generates a hydraulic pressure depending on an amount of depression of a brake pedal so as to mechanically brake at least drive wheels. The regenerative brake brakes the drive wheels due to a regeneration of a running motor. A reducing valve is provided in a hydraulic pressure transmission path to the drive wheels to be braked by the hydraulic brake. The reducing valve is opened when the hydraulic pressure genrated in a cylinder is at least a valve open value to allow a hydraulic pressure transmission to drive wheel pipings. An ECU calculates a regenerative torque command value depending on a pressure difference between the front and rear of the reducing valve, detected by a sensor, and controls the regenerative brake on the basis of the regenerative torque command value. In turn, a liquid amount corresponding to the hydraulic pressure cut off by the reducing valve is consumed with a similar characteristic to the hydraulic brake by a stroke simulator.

20 Claims, 5 Drawing Sheets

BRAKE CONTROL SYSTEM OF ELECTRIC VEHICLE

BACKGROUND OF THE INVENTION i) Field of the Invention:

The present invention relates to an electric vehicle provided with a hydraulic brake means and a regenerative brake means, and more particularly to a brake control system provided with a means for improving braking feeling and a means for performing a hydraulic control depending on a regenerative characteristic.

ii) Description of the Related Arts:

An electric vehicle is a vehicle having a motor as a driving source. As a braking system for an electric vehicle, for example, a liquid-pressure brake such as a hydraulic brake or the like and a regenerative brake using primary current control or the like of a motor are known.

The hydraulic brake is a braking means widely used for other kinds of vehicles. In this case, an oil pressure is generated depending on the amount of depression of a brake pedal and the generated oil pressure is transmitted to wheel cylinders or the like via piping to brake wheels of a vehicle. Since the wheels are mechanically braked by using the transmitted oil pressure, this brake can be used for both drive wheels and idle wheels.

The regenerative brake uses a principle of a regeneration of a motor for running. Hence, the regenerative brake is only mounted on vehicles such as a usual electric vehicle and a hybrid vehicle which also has an engine mounted. For example, when an induction motor as a running motor is used, by controlling a primary current of this induction motor, a necessary output torque can be obtained. This control, for instance, is carried out as a control of the primary current vector by a PWM (pulse width modulation) control of an inverter circuit. The regenerative brake can be realized by a part of this torque control, that is, the primary current control is carried out so that the motor may be operated as a generator so as to obtain a regenerative torque. Thus, the regenerative brake is used solely for braking the drive wheels.

When the hydraulic brake and the regenerative brake are used together, care must be taken. That is, it is necessary to adjust a brake force distribution between the drive wheels and the idle wheels so as to obtain a required braking force. In the electric vehicle or the hybrid vehicle, a rechargeable battery as a power source (at least a part thereof) of the running motor is used. Hence, by properly performing the brake force distribution, the regeneration of the motor is effectively carried out, and as a result, the possible running distance per unit battery charge can be elongated.

In a conventional vehicle braking system, for example, as disclosed in Japanese Utility Model Laid-Open No. Sho 63-29301, front drive wheels are braked by a regenerative brake and rear idle wheels are braked by a hydraulic brake. In this case, an oil pressure is changed so as to optimize a brake force distribution between the front and rear wheels. Hence, in this system, by properly performing the brake force distribution between the front and rear wheels, an electric vehicle can be smoothly braked. Further, the regeneration of the motor can be effectively carried out and the possible running distance per unit battery charge can be elongated.

In another conventional vehicle braking system, for instance, as disclosed in Japanese Patent Laid-Open No. Sho 64-43001, a hydraulic brake force is controlled to a value obtained by subtracting a regenerative brake force from a necessary brake force. In this case, the energy recovery due to the regeneration of the running motor can be suitably performed, and the possible running distance per unit battery charge can be elongated.

However, in the conventional vehicle braking system, when the brake force control is performed by the oil pressure change, a new problem arises. That is, when the brake force control is executed by the oil pressure change, the optimization of the brake force distribution is possible and an early locking of the wheels such as the front wheels braked by the regenerative force can be prevented. However, on the contrary, the stroke of the brake pedal is changed, and thus the braking feeling becomes bad.

Further, in the conventional vehicle braking system, when the front wheels are braked by the hydraulic brake and the regenerative brake, another problem occurs concerning a characteristic of an induction motor used for a running motor, that is, the maximum regenerative brake force (the maximum regenerative torque) is reduced in a high range of a revolution rate of the motor. That is, the maximum regenerative brake force at the high speed revolution of the motor (see FIG. 5A) becomes small compared with the maximum regenerative brake force at the low speed revolution of the motor (see FIG. 5B). Accordingly, the total brake force (the sum of the regenerative brake force and the hydraulic brake force) also becomes also small. Also, at the time of low speed revolution, when the maximum regenerative brake force is large, even when the necessary brake force is lower than the regenerative brake force, the hydraulic brake force is operated and thus an excessive brake force is often applied.

SUMMARY OF THE INVENTION

It is therefore an object of the present invention to provide a brake control system of an electric vehicle in view of the aforementioned problems of the prior art, which is capable of improving braking feeling while realizing an optimum brake force distribution between wheels, and realizing a detailed brake control adaptable to a difference between regenerative brake forces at high and low speed operations while effectively using a regenerative brake.

An electric vehicle provided with a brake control system according to one aspect of the present invention is an electric vehicle having a hydraulic brake means for generating a hydraulic pressure in response to a braking request to mechanically brake drive wheels and idle wheels and a regenerative brake means for braking the drive wheels using a regeneration of a running motor. In order to achieve the aforementioned object, the first aspect of the brake control system according to the present invention comprises:

(a) cutoff means arranged on a hydraulic pressure transmission path to the drive wheels for cutting off a hydraulic pressure transmission when the hydraulic pressure generated by the hydraulic brake means is below predetermined value;

(b) liquid consumption means for consuming a liquid amount corresponding to the cutoff hydraulic pressure on an opposite side to the drive wheels seen from the cutoff means when the hydraulic pressure is cut off by the cutoff means;

(c) pressure difference detection means for detecting a pressure deference generated between the front and rear of the cutoff means caused by the cutoff; and (d) regenerative brake control means for obtaining a regenerative torque command value depending on the pressure difference detected by the pressure deference detection means and controlling the regenerative brake means on the basis of the obtained regenerative torque command value.

In this construction, the drive wheels are braked by the hydraulic brake means and the regenerative brake means and the idle wheels are braked by the hydraulic brake means. At this time, the hydraulic brake means generates the hydraulic pressure in response to the braking request. When this liquid pressure is below a predetermined value, the cutoff means cuts off the hydraulic pressure transmission to the drive wheels. When the hydraulic pressure is cut off, a pressure difference is generated between the front and rear of the cutoff means. According to the present invention, a regenerative brake force equivalent to this different pressure is generated. That is, a regenerative torque command value is obtained by the regenerative brake control means on the basis of the regenerative torque command value.

As described above, since the regenerative brake force is changed depending on the braking request in the braking of the drive wheels, the brake force distribution between the drive wheels and the idle wheels can be optimized by the control of the regenerative brake force. For example, an early locking of the front wheels can be prevented.

Also, when the hydraulic pressure is cut off by the cutoff means, a consumed amount in the drive wheel side is reduced. In order to cover the consumed amount reduction and so that the total consumed hydraulic liquid amount seen from the liquid generation part may not be influenced by an operation or nonoperation of the cutoff means, according to the present invention, the liquid consumption means is provided. The liquid consumption means consumes the liquid amount corresponding to the cutoff hydraulic pressure in the opposite side to the drive wheels seen from the cutoff means. As a result, braking feeling is improved.

Also, an electric vehicle provided with a brake control system according to another aspect of the present invention is an electric vehicle having a hydraulic brake means for generating a hydraulic pressure in response to a braking request to mechanically brake drive wheels and a regenerative brake means for braking the drive wheels by a regeneration of a running motor. Also, as a regenerative brake force characteristic of the running motor, the following characteristic is assumed, that is, the maximum regenerative brake force is lowered with the increase of the revolution speed in the high revolution range where the revolution speed of the motor is beyond a high range reflection point, and the maximum regenerative brake force is almost fixed in the low revolution range where the revolution speed of the motor is below the high range reflection point. In order to achieve the aforementioned object, the second aspect of the brake control system according to the present invention comprises:

(a) a plurality of cutoff means arranged in series on a hydraulic pressure transmission path to the drive wheels for cutting off a hydraulic pressure transmission; each of the cutoff means cutting off the transmission when a difference of hydraulic pressure between a front and a rear thereof is below a predetermined cut-off value; the cut-off value being set at a different value for each of the cutoff means;

(b) pressure difference detection means for detecting a pressure difference generated between a front and a rear of the series of cutoff means by the cutoff;

(c) regenerative brake control means for obtaining a regenerative torque command value depending on the pressure difference detected by the pressure difference detection means and controlling the regenerative brake means on the basis of the obtained regenerative torque command value; and (d) path switch means for switching paths between the plurality of cutoff means by selectively by-passing the plurality of cutoff means depending on the revolution speed of the motor. The selection of the by-passing cutoff means is performed so that only either the cutoff means having a relatively low cut-off hydraulic pressure or the cutoff means having a relatively high cut-off different pressure is interposed on the hydraulic pressure transmission path when the revolution speed of the motor is either high or low, respectively.

In this construction, the drive wheels are braked by the hydraulic brake means and the regenerative brake means. The liquid consumption means generates the hydraulic pressure corresponding to the braking request. When at least one of the plurality of cutoff means connected in series is not by-passed, the hydraulic pressure is cut off by the cutoff means. When the hydraulic pressure is cut off, the regenerative braking of the drive wheels can be carried out depending on the pressure difference detected by the pressure difference detection means. When the hydraulic pressure is raised to be beyond of the predetermined cut-off value, all the cutoff means interposed on the hydraulic pressure transmission path are released. In this state, the hydraulic brake is further added. Further, when all the cutoff means are by-passed and not interposed on the hydraulic pressure transmission path, the hydraulic brake force is applied to the drive wheels.

In the above-described construction, a plurality of cutoff means are selectively by-passed. That is, when the revolution speed of the motor is in the high revolution range, that is, in the range where the maximum possible regenerative brake force is lowered with the revolution speed increase, as the cutoff means interposed (not by-passed) on the hydraulic pressure transmission path, the cutoff means with a relatively low cut-off pressure is selected. By performing such a selection, even when the pressure difference between the front and rear of the cutoff means is relatively low, the hydraulic pressure is applied to the drive wheels. On the contrary, when the revolution speed of the motor is in the low revolution range, that is, in a range where the the maximum possible regenerative brake force is almost fixed regardless the revolution speed, as the cutoff means interposed (not by-passed) on the hydraulic pressure transmission path, the cutoff means with a relatively high cut-off pressure is selected. When such a selection is performed, by raising the pressure difference between the front and rear of the cutoff means to the relatively high, the hydraulic pressure is applied to the drive wheels.

Therefore, when the revolution speed of the motor is within the high revolution range, the hydraulic brake force rate of the brake force applied to the drive wheels is raised. Since the maximum regenerative brake force of the motor is lowered in the high revolution range, by raising the hydraulic brake force rate, the lowered part of the regenerative brake force is compensated for. On the contrary, when the revolution speed of the motor is within the low revolution range, the hydraulic brake force rate of the brake force acted on the drive wheels is not so high compared with the high revolution range. Since the maximum regenerative brake force is large in the low revolution range, even when the hydraulic brake force rate of the brake force applied to the drive wheels is determined to a relatively low value, no problem is caused, and the regenerative brake can be effectively used.

As described above, in the above-described construction since the action start point of the hydraulic brake force is switched depending on the difference of the regenerative brake force in the high and low revolution ranges, the regenerative brake is effectively used and the hydraulic brake can be adjusted depending on the regenerative characteristic to prevent excessive braking in the low revolution range or the like.

The above-described constructions can be applied in various embodiments. For example, when the running motor is an AC induction motor, the regenerative brake means can be realized by an inverter circuit for converting the DC power into AC power to supply the AC power as the drive power to the motor. In this case, the regenerative brake control means controls the power supplied from the inverter circuit to the motor on the basis of a regenerative torque command value. At this time, by providing step-on detection means for detecting the braking request as the brake pedal is depressed, the control in the non depressed state of the brake pedal can be carried out by determining the regenerative torque command value to zero. Further, by providing a check valve for holding the pressure difference between the front and rear of one cutoff means or a plurality of cutoff means connected in series, the pressure defference held by the check valve is detected by the pressure difference detection means and the regenerative brake control can be executed.

Further, the hydraulic brake means can be constituted by hydraulic pressure generation means and hydraulic pressure action means. In this case, the hydraulic pressure generation means is a member such as a brake master cylinder or the like and generates the hydraulic pressure in response to the amount depression of the brake pedal. Also, the hydraulic pressure action means is a member such as a wheel cylinder or the like and applies the hydraulic pressure generated in the generation means to the drive wheels when the hydraulic pressure transmission path is not cut off. The pressure difference detection means can be a sensor for detecting the pressure difference between the hydraulic pressure generated in the hydraulic pressure generation means and the hydraulic pressure in the hydraulic pressure action means. When the check valve is used, the pressure difference detection means detects the pressure difference held by the check valve.

For example, the cutoff means can be a reducing valve interposed on the hydraulic pressure transmission path from the hydraulic pressure generation means to the hydraulic pressure action means. The reducing valve is opened when the pressure difference between its front and rear reaches the valve open value (the cut-off value) and is closed when it does not reach the valve open value. By providing the reducing valve on the hydraulic pressure transmission path from the hydraulic pressure generation means to the hydraulic pressure action means, when the pressure difference between the hydraulic pressure generated in the hydraulic pressure generation means and the hydraulic pressure in the hydraulic pressure action means is below the valve open value, the hydraulic pressure transmission is cut off, and, when the pressure difference pressure is greater than the valve open value, the hydraulic pressure transmission is released.

Further, in the above-described second construction, a plurality of cutoff means connected in series are provided. When a plurality of reducing valves as the cutoff means are provided on the hydraulic pressure transmission path from the hydraulic pressure generation means to the hydraulic pressure action means, the reducing valves are selectively by-passed or interposed on the hydraulic pressure transmission path by corresponding solenoid valves or the like to carry out the hydraulic brake force adjustment according to the regenerative brake force characteristic.

As the liquid consumption means, for example, a stroke simulator can be used. The stroke simulator 38 consumes the liquid amount of the hydraulic pressure generation means with a similar characteristic to the hydraulic pressure action means. Also, the possible consumed maximum liquid amount (bottoming liquid amount) is determined to the valve open value of the corresponding reducing valve. Because of this, even when the hydraulic pressure transmission is cut off by the reducing valve and thus the consumed liquid amount is not consumed in the hydraulic pressure action means, the consumed liquid amount corresponding to that of the hydraulic pressure action means is consumed by the stroke simulator, and thus the brake pedal stroke is not changed and a good braking feeling can be obtained.

Also, when the AC induction motor is used as the running motor, the regenerative brake force is sharply reduced at the extremely low revolution speed. In such an extremely low revolution range, the reducing valve is not interposed on the hydraulic pressure transmission path, and it is preferable to directly apply the hydraulic pressure generated by the hydraulic pressure action means to the drive wheels. According to the present invention, such a control can be carried out.

Further, the regenerative brake control means can be constructed by an electronic control unit (ECU) or the like. Also, in order to execute each control depending on the revolution speed of the motor described above, revolution speed detection means for detecting the revolution speed of the motor can be provided.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
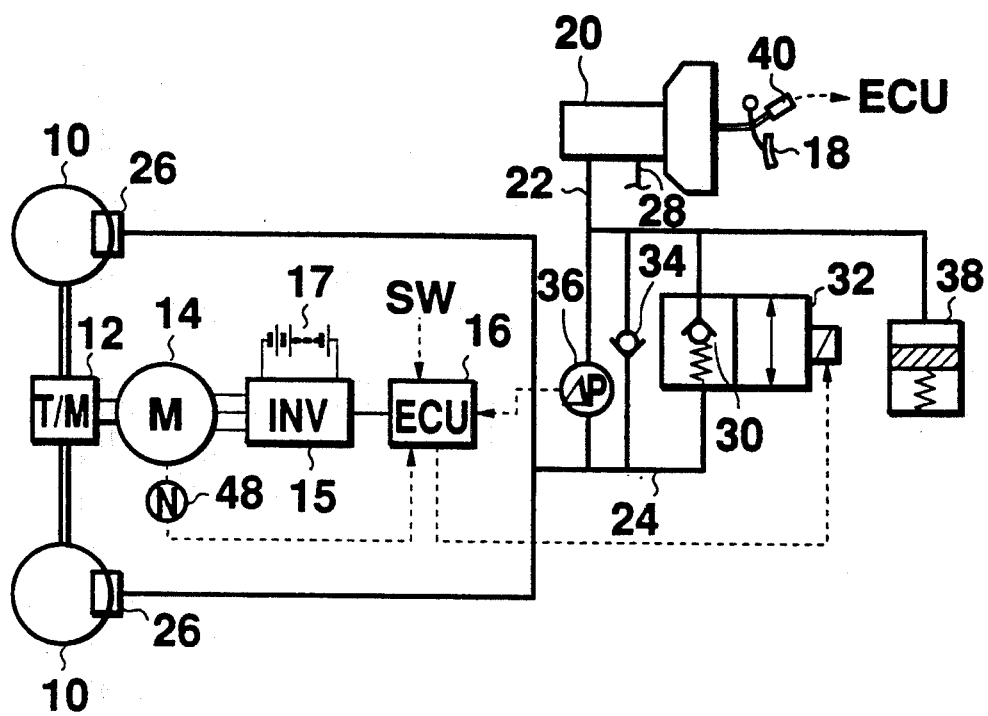
FIG. 1 is a schematic block diagram of a first embodiment of a brake control system of an electric vehicle according to the present invention.
Figure 3:
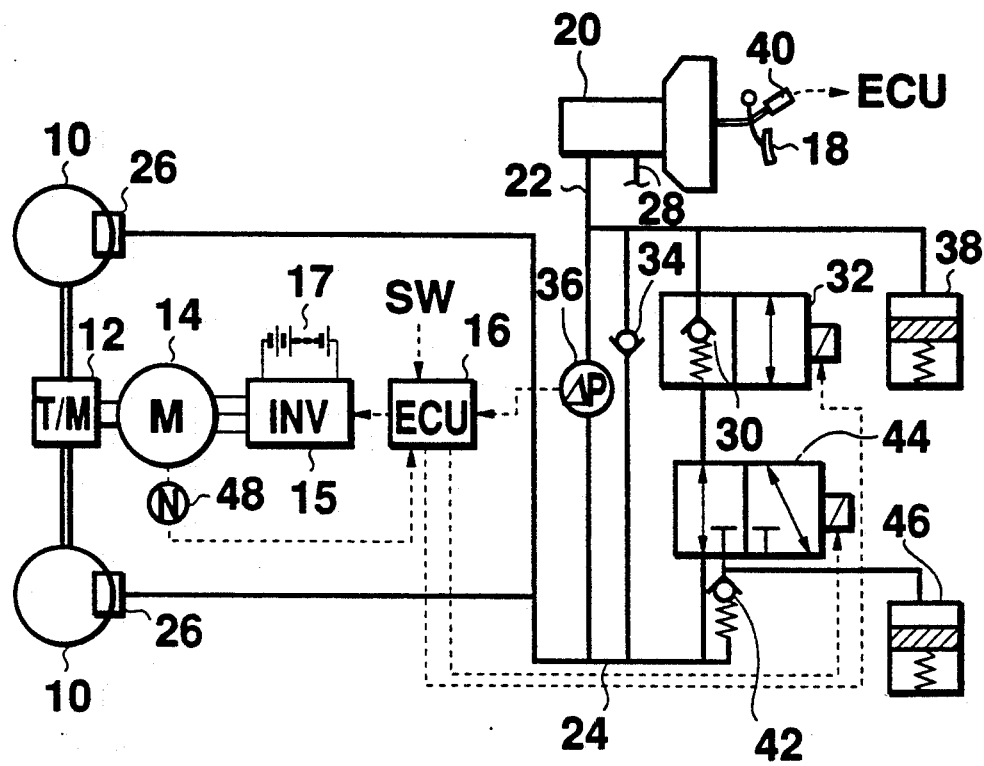
FIG. 3 is a schematic block diagram of a second embodiment of a brake control system of an electric vehicle according to the present invention.

Referring now to the drawings, wherein like reference characters designate like or corresponding parts throughout the views and thus the repeated description thereof can be omitted for brevity the present invention will be described. In FIGS. 1 and 3, hydraulic piping, electric wiring and an electric signal system are shown by a thick solid line, a thin solid line and a broken line, respectively. There is shown in FIG. 1 an electric vehicle provided with the first embodiment of a brake control system according to the present invention.

The electric vehicle shown in FIG. 1 includes front drive wheels 10 and rear idle wheels (not shown). The two front wheels 10 are driven by an AC motor 14 via a transmission 12. The motor 14 outputs a necessary torque under the control of an ECU (electronic control unit) 16. As the motor 14, for example, an induction motor can be used, and the output torque of the induction motor is controllable. A revolution sensor 48 for detecting the revolution number of the motor 14 is attached to the motor 14.

When this kind of motor is used as the motor 14, it is necessary to convert a DC voltage output from a battery 17 into an AC voltage and to apply the AC voltage to the motor 14. For this DC-AC conversion means, an inverter circuit 15 is employed. That is, the inverter circuit 15 converts the DC voltage output from the battery 17 into the AC current to apply the obtained AC current to the motor 14. Also, the inverter circuit 15 is comprised of the desired number of switching elements, and by controlling the switching operations of the switching elements by PWM signals, the vector control of the AC current output from the inverter circuit 15 can be performed. By executing such a control, the output torque of the motor 14 can be controlled. This control is carried out by the ECU 16.

Figure 2A:
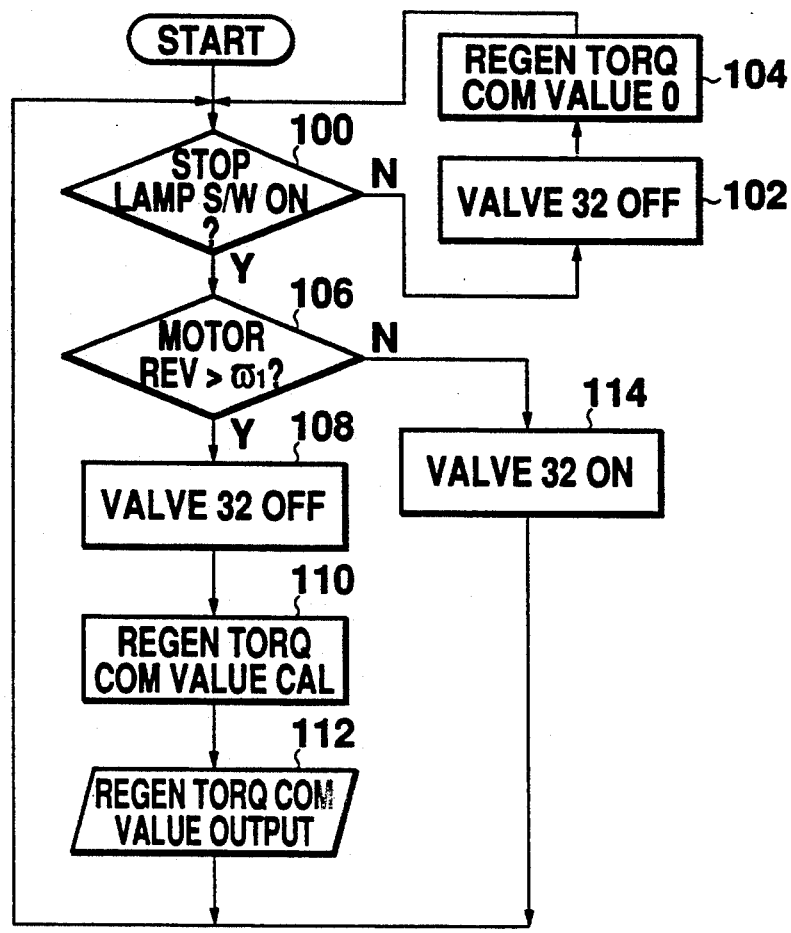
FIG. 2A is a flow chart of an operation of an ECU shown in FIG. 1
Figure 2B:
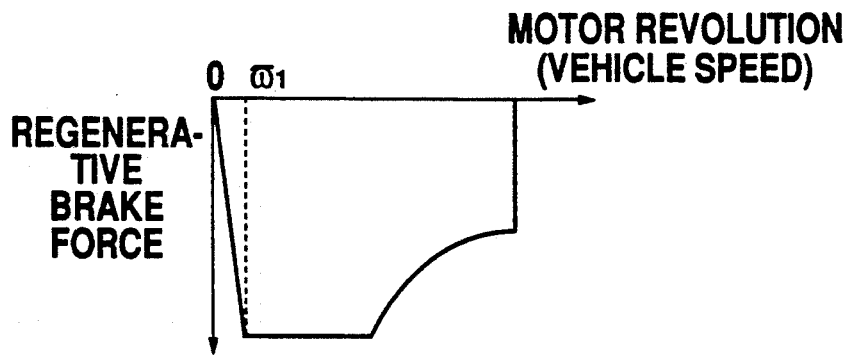
FIG. 2B is a graphical representation showing regenerative characteristics of a motor and a switching point of an oil pressure supply to a front brake in the system shown in FIG. 1.

The braking of the front wheels 10 due to the regeneration of the motor 14 is carried out as a part of such a torque control. The motor 14 possesses the regenerative characteristic, as shown in FIG. 2B, and thus depending on the revolution speed of the motor 14, the regenerative torque (regenerative brake force) as shown in FIG. 2B can be produced.

The electric vehicle shown in FIG. 1 is provided with a hydraulic brake mechanism in addition to the regenerative brake means. The hydraulic brake mechanism includes a brake master cylinder 20 for generating an oil pressure depending on an amount of depression of a brake pedal 18. A stop lamp switch 40 is attached to the brake pedal 18 and is switched on when the brake pedal 18 is depressed. The oil pressure generated in the brake master cylinder 20 is transmitted to from wheel cylinders 26 mounted to the front wheels 10 via pipings 22 and 24 and rear wheel cylinders of rear wheels (not shown) via piping 28. Hence, in this embodiment, the front driving wheels 10 are braked by the regenerative means and hydraulic brake mechanism, and the rear idle wheels are braked by the hydraulic brake mechanism.

Further, in this embodiment, in order to enable an optimization of a brake force distribution between the front and rear wheels, an oil pressure cutoff means for cutting the transmission of the oil pressure from the piping 22 to the piping 24 is provided between the pipings 22 and 24. Also, in this embodiment, there is provided means for simulating an oil consumption amount of the wheel cylinders 26 when the oil pressure is cut off by the oil pressure cutoff means and improving braking feeling. These means have distinctive constructions in this embodiment as hereinafter described in detail.

First, as the oil pressure cutoff means, a reducing valve 30 is provided. The reducing valve 30 is arranged between the pipings 22 and 24 along with a solenoid valve 32. The solenoid valve 32 is switched on or off by the ECU 16. In the state that the solenoid valve 32 is switched on, the two pipings 22 and 24 are connected to each other regardless of the state of the reducing valve 30, and thus the oil pressure is transmitted from the piping 22 to the piping 24. Since the piping 24 is connected to the front wheel cylinders 26 of the front wheels 10, in this state, the hydraulic braking of the front wheels 10 can be performed by the oil pressure transmitted to the front wheel cylinders 26 from the piping 22 via the piping 24. That is, even when the reducing valve 30 is closed, the solenoid valve 32 can connect the pipings 22 and 24 to each other.

In the state that the solenoid valve 32 is switched off, the reducing valve 30 can control the transmission of the oil pressure between the pipings 22 and 24. That is, when a pressure difference ΔP between the front and the rear of the reducing valve 30 is below a predetermined value (valve open value), the reducing valve 30 does not open, that is, it cuts off the oil pressure transmission between the pipings 22 and 24. On the other hand, when the pressure difference ΔP is more than the valve open value, the reducing valve 30 opens to allow the oil pressure to be transmitted from the piping 22 to the piping 24. In the state that the solenoid valve 32 is switched off, the pressure difference between the pipings 22 and 24 corresponds to the pressure difference ΔP between the front and the rear of the reducing valve 30.

A check value 34 is arranged between the pipings 22 and 24 in parallel with the reducing valve 30 and can keep the pressure difference ΔP between the front and the rear of the reducing valve 30. Further, in order to enable an adjustment of the regenerative brake force on the basis of the pressure difference ΔP, there is provided an oil pressure sensor 36 for detecting the pressure difference ΔP and outputting the detected value to the ECU 16.

As the means for simulating the amount of oil consumption when the oil pressure transmission from the piping 22 to the piping 24 is cut off and improving the braking feeling, a stroke simulator 38 is provided. The stroke simulator 38 is located in the brake master cylinder side seen from the reducing valve 30. When the oil pressure transmission is cut off by the reducing valve 30, the stroke simulator 38 consumes an amount of oil of the brake master cylinder 20 in a similar manner to the front wheel cylinders 26. The maximum amount of oil consumed by the stroke simulator 38 is determined according to the valve open value of the reducing valve 30. That is, when the reducing valve 30 is opened, the consumed oil amount of the stroke simulator 38 becomes the maximum.

Next, the operation of the ECU 16 will be described in connection with FIGS. 2A and 2B. FIG. 2A shows a control flow of the ECU 16 in this embodiment, and FIG. 2B shows on-and off-points of the solenoid valve 32.

First, the ECU 16 discriminates whether or not the brake pedal 18 is depressed in step 100. As shown in FIG. 1, when the brake pedal 18 is depressed on, the stop lamp switch 40 is switched on. In fact, the ECU 16 executes step 100 by discriminating the on or off condition of the stop lamp switch 40.

As a result of the discrimination, when it is discriminated that the brake pedal 18 is not depressed, the ECU 16 allows the solenoid valve 32 to switch off in step 102. When the solenoid valve 32 is switched off, the oil pressure transmission from the piping 22 to the piping 24 is cut off by the reducing valve 30. The ECU 16 further makes a regenerative torque command value to be zero in step 104.

The regenerative torque command value is a command value used for controlling the inverter circuit 15 and a value for instructing the regenerative torque value when the regenerative braking is performed by the motor 14. Hence, when step 104 is executed, no regenerative brake force is produced. Further, since the oil pressure transmission from the piping 22 to the piping 24 is cut off by the reducing valve 30, no hydraulic brake force is produced. As described above, when the brake pedal 18 is not depressed, each of the hydraulic brake mechanism and the regenerative brake means are controlled so that no brake force may be given to the front wheels 10 and the rear wheels.

When the stop lamp switch 40 is switched on, the ECU 16 considers that the brake pedal 18 is depressed in step 100. On this occasion, the ECU 16 discriminates whether or not the revolution speed of the motor 14 is greater than $\omega_1$ in step 106. The ECU 16 executes step 106 on the basis of the output of the revolution sensor 48.

When the revolution speed of the motor 14 is greater than $\omega_1$, the ECU 16 allows the solenoid valve 32 to switch off in step 108. At this time, when the pressure difference $\Delta P$ is small and is not greater than the valve open value of the reducing valve 30, the reducing valve 30 is kept closed. On the other hand, when the pressure difference $\Delta P$ is large and is above the valve open value of the reducing valve 30, the reducing valve 30 is opened so as to transmit the oil pressure from the piping 22 to the piping 24.

After the execution of step 108, the operation of the ECU 16 is moved to step 110. In step 110, the ECU 16 calculates the regenerative torque command value on the basis of the pressure difference $\Delta P$ detected by the oil pressure sensor 36. Then, the ECU 16 executes the PWM control of the inverter circuit 15 on the basis of the calculated regenerative torque command value in step 112. As a result, the output torque of the motor 14 becomes the regenerative torque corresponding to the regenerative torque command value.

At this time, when the pressure difference $\Delta P$ is small and the oil pressure transmission is cut off by the reducing valve 30, the oil pressure of the brake master cylinder 20 is not transmitted to the front wheel cylinders 26 and is only transmitted to the rear brake (not shown). Hence, in this state, the front wheels 10 are braked by only the regenerative brake and the rear wheels are braked by only the hydraulic brake.

On the other hand, when the pressure difference $\Delta P$ is large and the oil pressure transmission from the piping 22 to the piping 24 is communicated, the oil pressure of the brake master cylinder 20 is transmitted to both the front wheel cylinders 26 and the rear wheel cylinders (not shown). Accordingly, in this state, the front wheels 10 are braked by both the regenerative brake and the hydraulic brake and the rear wheels are braked by only the hydraulic brake. At this time, the oil pressure (the difference detected by the oil pressure sensor 36) from the basis of the calculation of the regenerative torque command value is the pressure difference $\Delta P$ held by the check value 34.

Further, when the revolution speed of the motor 14 is not greater than $\omega_1$ in step 106, the ECU 16 makes the solenoid valve 32 switch on in step 114. Hence, the oil pressure transmission from the piping 22 to the piping 24 can be possible. In this case, as shown in FIG. 2B, $\omega_1$ is a lower limit value of a revolution speed range in which the regenerative brake force becomes a fixed value. The reason why the oil pressure transmission from the piping 22 to the piping 24 can be allowed when the revolution speed of the motor 14 is not greater than $\omega_1$ so as to use the hydraulic brake force, is considering that the regenerative brake force is not large enough when the revolution speed of the motor 14 is not greater than $\omega_1$.

After step 104, 112 or 114, the operation is returned to step 100 and the above-described operation is repeated.

Next, the operation of the stroke simulator 38 relating to the aforementioned operation and the feature of this embodiment will now be described in connection with depressing of the brake pedal by a driver.

First, when the driver starts to depress on the brake pedal 18, the stop lamp switch 40 is switched on. The ECU 16 discriminates the on/off condition of the stop lamp switch 40 in step 100 to detect the fact that the brake pedal 18 is depressed. Then, the ECU 16 comes to the operations of steps 106 to 114. As described above, the steps 106 to 114 are the brake control operations depending on the revolution speed of the motor 14. Since the revolution speed of the motor 14 is greater than $\omega_1$ at the usual running time, the ECU 16 allows the solenoid valve 32 to switch off to interpose the reducing valve 30 between the pipings 22 and 24 or to charge the reducing valve 30 with the control of the oil pressure transmission from the piping 22 to the piping 24 (steps 106 and 108).

In a short depression condition of the brake pedal 18 even when the brake pedal 18 is depressed, the pressure difference $\Delta P$ between the pipings 22 and 24 is smaller than the valve open value of the reducing valve 30. In this state, the oil pressure transmission between the pipings 22 and 24 is cut off by the reducing valve 30. In turn, the ECU 16 executes steps 110 and 112 after step 108. As a result, the regenerative braking of the front wheels 10 is carried out in response to the regenerative torque command value calculated according to the pressure difference $\Delta P$. That is, no hydraulic brake acts on the front wheels 10. Hence, in this state, the brake force distribution between the front and rear wheels can be optimized by the regenerative brake force control.

However, since the oil pressure is cut off by the reducing valve 30, the oil amount to be intrisically consumed in the front wheel cylinders 26 can not be consumed. Hence, the stroke simulator 38 consumes the oil amount to be consumed in the front wheel cylinders 26 in order to achieve the brake pedal stroke without any feeling of physical disorder, that is, a good braking feeling.

When the brake pedal 18 is further depressed on, the pressure difference ΔP between the pipings 22 and 24 becomes greater than the valve open value of the reducing valve 30 at a predetermined point, and the reducing valve 30 is opened. Thus, the oil pressure of the brake master cylinder 20 is applied to the front wheel cylinders 26. Thus, in this condition, the front wheels 10 are braked by the oil pressure. Also, the stroke simulator 38 is designed so as to carry out a bottoming at the open time point of the reducing valve 30 (that is, the consumed oil amount becomes the maximum and thus no more oil can be consumed). For example, in the case that the reducing valve 30 opens at 10 atms., the stroke simulator 38 is designed so as to perform the bottoming at 10 atms. Further, in this state, the pressure difference ΔP is held by the check value 34, and thus the regenerative brake force corresponding to the pressure difference ΔP is also given to the front wheels 10.

After this, upon releasing the brake pedal 18 by the driver, the pressure difference ΔP held by the check value 34 is reduced. Hence, the regenerative brake force is also reduced. When the pressure difference ΔP is reduced to zero, the oil pressure given to the front wheels 10 via the check value 34 is reduced, and the hydraulic brake force is reduced accordingly.

When the revolution speed of the motor 14 is reduced by such a braking, that is, just before the vehicle stops, the regenerative brake force is lowered depending on the reduction of the revolution speed of the motor 14 (see FIG. 2B). That is, when the revolution speed of the motor 14 is below $\omega_1$, the brake force given to the front wheels 10 becomes almost only the hydraulic brake force.

In this embodiment, for the countermeasure of such a case, steps 106 and 114 are executed. That is, when the revolution number of the motor 14 becomes below $\omega_1$, the pipings 22 and 24 are directly communicated by the solenoid valve 32, and the oil pressure of the brake master cylinder 20 is given almost intact to the front wheel cylinders 26. As a result, even when the revolution speed of the motor 14 is considerably reduced as the vehicle comes to a standstill, the brake force can be sufficiently obtained by the oil pressure. This control is especially effective when the vehicle is stopped on a sloping road. After the vehicle is stopped and the brake pedal 18 is no longer depressed, the solenoid valve 32 is switched off to return to the oil pressure cutoff state by the reducing valve 30.

As described above, in this embodiment, the brake force distribution between the front and rear wheels can be optimized to prevent the early locking of the front wheels 10 or the like. Further, since the consumed oil amount of the front wheel cylinders 26 can be simulated by the stroke simulator 38, the feeling of physical disorder in the brake pedal stroke can be prevented and the braking feeling is improved.

In FIG. 3, there is shown the second embodiment of a brake control system provided on an electric vehicle according to the present invention, having the same construction as the first embodiment shown in FIG. 1, except that a reducing valve 42, a solenoid valve 44 and a stroke simulator 46 are further added between a reducing valve 30 and piping 24.

In this embodiment, when the solenoid valve 44 is switched on, the solenoid valve 44 allows the reducing valve 42 to interpose between the reducing valve 30 and the piping 24, and when the solenoid valve 44 is switched off, the solenoid valve 44 makes to directly connect the reducing valve 30 and the piping 24. The reducing valve 42 cuts off the oil pressure transmission between the reducing valve 30 and the piping 24 when the pressure between the front and the rear thereof is not greater than a predetermined valve open value and opens or releases to become the oil pressure transmission possible state when the pressure is greater than the predetermined value. Also, the stroke simulator 46 is determined so as to carry out the bottoming at the valve open value of the valve 42, and hence, when the corresponding reducing valve 42 is opened, the amount of oil consumption of the stroke simulator 46 becomes the maximum. Also, the stroke simulator 46 simulates the amount of oil consumption of the front wheel cylinders 26 in the state that the the oil pressure transmission between the reducing valve 30 and the piping 24 is cut off by the reducing valve 42. That is, the stroke simulator 46 consumes the oil amount of the brake master cylinder 20 in the similar manner to the front wheel cylinders 26.

Figure 4A:
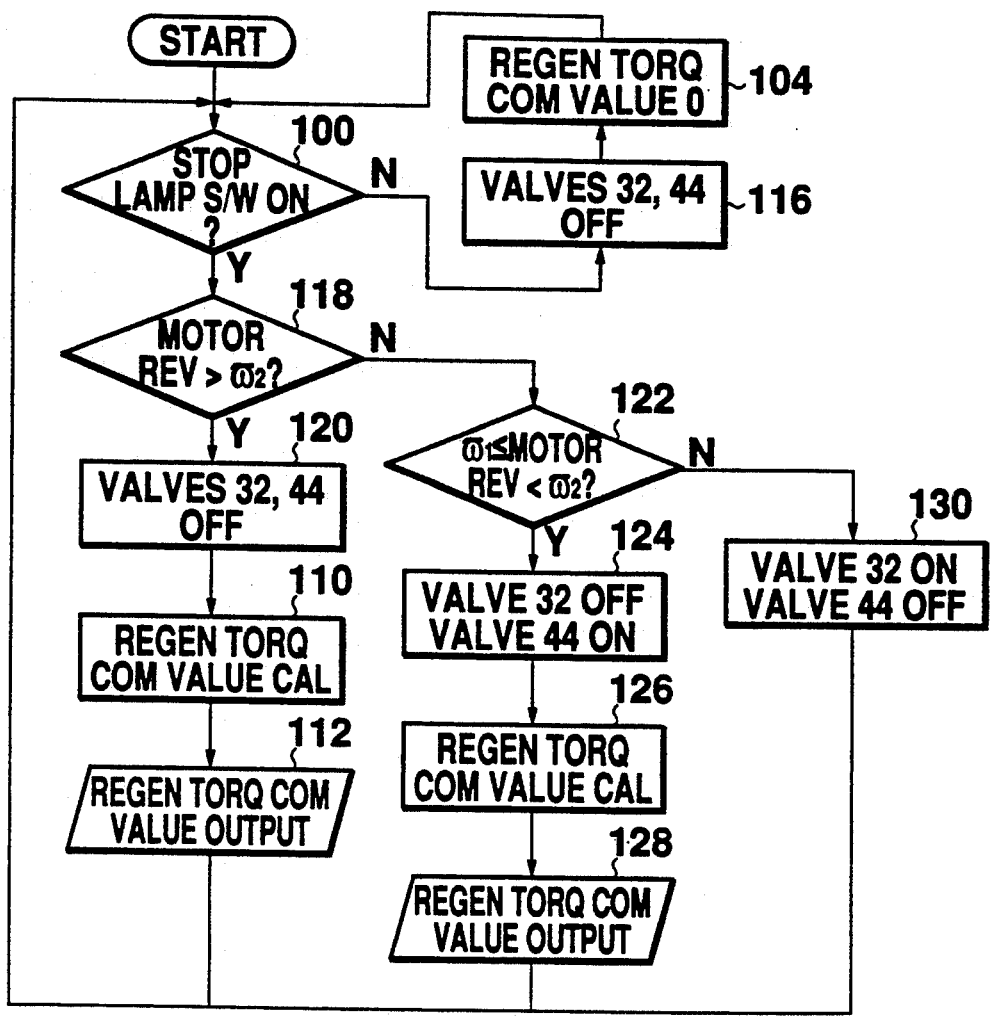
FIG. 4A is a flow chart of an operation of an ECU shown in FIG. 3
Figure 4B:
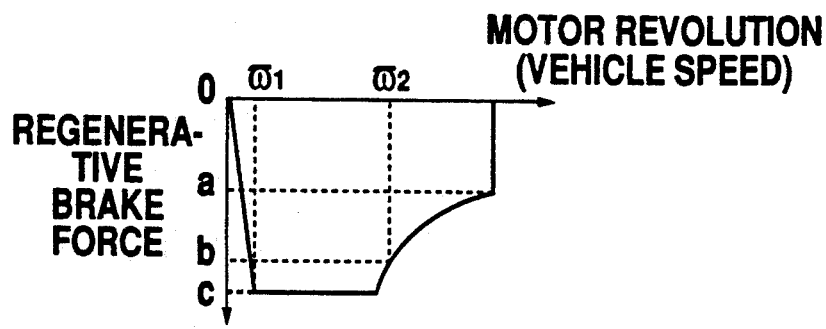
FIG. 4B is a graphical representation showing regenerative characteristics of a motor and a switching point of an oil pressure supply to a front brake in the system shown in FIG. 3.

In this case, the valve open values of the reducing valves 30 and 42 are determined, as shown in FIG. 4B. That is, the valve open value of the reducing valve 30 is determined to a pressure equivalent to a regenerative brake force (regenerative torque) a at the maximum revolution speed and the value open value of the reducing valve 42 is determined to a pressure equivalent to a regenerative brake force b decided by a sensory test or the like of the vehicle. The brake force b is close to the maximum regenerative brake force c in the revolution range between $\omega_1$ and $\omega_2$. These determinations concern the features of the present invention and will be described hereinafter in combination with the operation.

The check value 34 and the oil pressure sensor 36 are arranged in parallel with the series connection of the reducing valve 30 and the reducing valve 42, differently from the first embodiment described above. The check value 34 holds the pressure difference ΔP between the pipings 22 and 24, and the oil pressure sensor 36 detects the pressure difference ΔP in order to enable the adjustment of the regenerative brake force depending on the pressure difference ΔP.

In this embodiment, attention is paid to the fact that the regenerative brake force of the motor 14 is lowered at the high revolution range of the motor 14. As shown in FIG. 4B, the regenerative brake force of the motor 14 starts to fall as the revolution speed of the motor 14 increases. Hence, at the high speed time (see FIG. 5A), the regenerative brake force is reduced compared with operation at the low speed time (see FIG. 5B). In this embodiment, the attention is paid to this change. That is, at the high revolution range where the regenerative brake force is lowered, the hydraulic brake force relating to the front wheels 10 can be more accurately controlled.

Next, the operation of the ECU 16 will be described in connection with FIGS. 4A and 4B. FIG. 4A shows a control flow of the ECU 16 in this embodiment, and FIG. 4B shows on-and off-points of the solenoid valves 32 and 44. In this case, the ECU 16 performs a different control from the first embodiment described above.

First, the ECU 16 executes step 100 in the same manner as the first embodiment. When the brake pedal 18 is not depressed, the ECU 16 makes the solenoid valves 32 and 44 switch off in step 116. When the solenoid valve 32 is switched off, the reducing valve 30 is interposed on the oil pressure transmission path to the front wheels 10, and further, when the solenoid valve 44 is switched off, the reducing valve 42 is by-passed. Hence, only the reducing valve 30 is interposed between the pipings 22 and 24 after execution of step 116. After executing step 104 in the same manner as the first embodiment, the ECU 16 is returned to step 100. Thus, in this embodiment, when the brake pedal 18 is not depressed, the operation is substantially the same as the first embodiment.

When the brake pedal 18 is depressed, the stop lamp switch 40 is switched on, and the ECU 16 detects the depression in step 100. In this case, the ECU 16 discriminates whether or not the revolution speed of the motor 14, detected by the revolution sensor 48 is above $\omega_2$ corresponding to the force b in step 118. As shown in FIG. 4B, $\omega_2$ is determined near the boundary of a high revolution range where the regenerative brake force starts to drop and a range where the regenerative brake force becomes a fixed value.

When the revolution speed of the motor 14 is greater than $\omega_2$, the ECU 16 allows the solenoid valves 32 and 44 to switch off in step 120. When the solenoid valves 32 and 44 are switched off, the reducing valve 30 is interposed between the pipings 22 and 24.

In this case, the valve open value of the reducing valve 30 is determined to a pressure corresponding to a regenera-tive brake force a shown in FIG. 4B. Hence, when the pressure difference $\Delta P$ is less than the pressure equivalent to the regenerative brake force a at a time point of execution of step 120, the reducing valve 30 is kept closed, and the oil pressure of the brake master cylinder 20 is not transmitted to the front wheels 10. At this time, the consumed oil amount corresponding to that of the front wheel cylinders 26 is consumed by the stroke simulator 38, and the braking feeling can be maintained.

When the pressure difference $\Delta P$ is beyond the pressure equivalent to the regenerative brake force a at the time point of the execution of step 120, the reducing valve 30 is released to transmit the oil pressure from the piping 22 to the piping 24. Since the stroke simulator 38 has already reached the bottoming point at the point that the pressure difference $\Delta P$ reaches the valve open value of the reducing valve 30 or the pressure equivalent to the regenerative brake force a, the stroke simulator 38 does not give any influence to the brake pedal stroke in this situation.

After execution of step 120, the ECU 16 executes steps 110 and 112 in the same manner as the first embodiment, and then the operation is returned to step 100. At this time, when the pressure difference $\Delta P$ is small and thus the transmission is cutoff by the valve 30, the front wheels 10 are braked by the regenerative brake and the rear wheels are braked by the hydraulic brake, respectively. On the contrary, when the pressure difference $\Delta P$ is large and thus the transmission is allowed, the front wheels 10 are braked by both the regenerative brake and hydraulic brake, and the rear wheels are braked by the hydrulic brake. The pressure difference $\Delta P$ held by the check valve 38 is used to calculate the regenerative brake command valve.

When it is discriminated that the revolution speed of the motor 14 is not greater than $\omega_2$ in step 118, the ECU 16 discriminates whether or not the revolution speed of the motor 14 is at least $\omega_1$ and also less than $\omega_2$ in step 122. When this condition is satisfied in step 122, the solenoid valve 32 is switched off and the solenoid valve 44 is switched on in step 124. When the solenoid valve 32 is switched off, the reducing valve 30 is interposed on the oil pressure transmission path to the front wheel cylinders 26, and, when the solenoid valve 44 is switched on, the reducing valve 42 is interposed on the same oil pressure transmission path. Hence, at the time point after the execution of step 124, the reducing valves 30 and 42 are interposed in series between the pipings 22 and 24.

In this embodiment, the reducing valve 42 is opened at an oil pressure corresponding to a regenerative brake force b shown in FIG. 4B. Hence, when the pressure difference $\Delta P$ is less than the pressure corresponding to the regenerative brake force b at the time point after the execution of step 124, the oil pressure transmission between the pipings 22 and 24 is cut off by the reducing valves 30 and 42. At this time, since the amount of oil consumption corresponding to that of the front wheel cylinders 26 is consumed by the stroke simulator 46, the brake pedal stroke becomes good. In turn, when the pressure difference $\Delta P$ is greater than the pressure corresponding to the regenerative brake force b, the reducing valves 30 and 42 are opened, and the oil pressure transmission is possible from the piping 22 to the piping 24. Since the stroke simulator 46 carried out the bottoming at the valve open value of the reducing valve 42, in this state, no influence is given to the brake pedal stroke.

After the execution of step 124, a regenerative torque command value calculation and its output are executed in respective steps 126 and 128 in the same manner as steps 110 and 112. Then, the operation is returned to step 100.

When it is discriminated that the condition is not satisfied in step 122, the revolution speed of the motor 14 is low and a sufficient regenerative brake force can not be obtained in the same manner as the case when the condition is not satisfied in step 106 in the first embodiment described above. Therefore, in order to brake the front wheels 10 by the hydraulic brake force, the solenoid valve 32 is switched on and the solenoid valve 44 is switched off to directly connect the pipings 22 and 24 in step 130. After this step, the operation is returned to step 100.

Next, the operation of the stroke simulators 38 and 46 relating to the aforementioned operation and the feature of this embodiment will now be described in connection with the brake pedal operation by a driver.

First, when the driver starts to depress the brake pedal 18, the ECU 16 starts the brake control depending on the revolution speed of the motor 14. At the high speed time that the revolution number of the motor 14 is greater than $\omega_2$ determined by the sensory test and the like of the vehicle, the solenoid valves 32 and 44 are switched off.

At this time, when the depression of the brake pedal 18 is slight, since the pressure difference $\Delta P$ is small, the path between the pipings 22 and 24 is cut off by the reducing valve 30. The ECU 16 calculates the regenerative torque command value depending on the pressure difference $\Delta P$ detected by the oil pressure sensor 36. Hence, the front wheels 10 can be braked by only the regenerative brake. At this time, by properly determining the regenerative torque command value, the brake force distribution can be optimized. Further, the good brake feeling can be realized by the stroke simulator 38.

When the brake pedal 18 is further stepped on during the high speed of the vehicle, the pressure difference $\Delta P$ is greater than the valve open value of the reducing valve 30. Then, the reducing valve 30 is opened, and the oil pressure acts on the front wheels 10. Further, by the pressure difference $\Delta P$ held by the check value 34, the regenerative brake force is also given to the front wheels 10. In this state, the stroke simulator 38 has already reached the bottoming point.

Next, one state of the revolution speed of the motor 14 is considered, that is, the revolution speed of the motor 14 is at least $\omega_1$ and also less than $\omega_2$. This state is generated after the braking is given from the state that the revolution speed of the motor 14 is beyond $\omega_2$ or when the revolution speed of the motor 14 is gradually raised. When braking from such a low speed running state, by the operation in step 124, the solenoid valve 32 is switched off and the solenoid valve 44 is switched on.

At this time, when the depression of the brake pedal 18 is slight, since the pressure difference $\Delta P$ is small, path between the pipings 22 and 24 is cut off by the reducing valves 30 and 42. The ECU 16 calculates the regenerative torque command value depending on the pressure difference $\Delta P$ detected by the oil pressure sensor 36, and the front wheels 10 are braked by only the regenerative brake.

At this time, the regenerative brake force can be enlarged compared with the high speed time. That is, while the cutoff of the path between the pipings 22 and 24 is released at the pressure difference $\Delta P$ corresponding to the regenerative brake force a by using only the reducing valve 30 as at the high speed time, at the low speed time using the reducing valves 30 and 42, the cutoff of the oil pressure transmission between the pipings 22 and 24 is continued until the pressure difference $\Delta P$ corresponds to the regenerative brake force b, that is, the larger pressure difference than that corresponding to the regenerative brake force a. Hence, the front wheels 10 are braked by the regenerative brake force which is at least a and also less than b.

At the low speed time, when the brake pedal 18 is further depressed and the pressure difference $\Delta P$ is greater than the value capable of cutting of the oil pressure transmission by the reducing valves 30 and 42, the reducing valves 30 and 42 are opened, and the oil pressure is given to the front wheel cylinders 26. Further, by the pressure difference $\Delta P$ held by the check value 34, the regenerative brake force is also given to the front wheel cylinders 26.

Figure 5A:
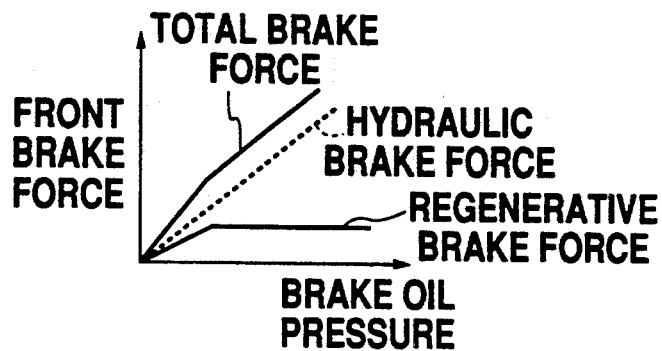
FIGS. 5A and 5B are graphical representations showing a regenerative brake force and a total brake force at high and low speed revolutions of a motor, respectively, when a regenerative brake and a hydraulic brake are used together.
Figure 5B:
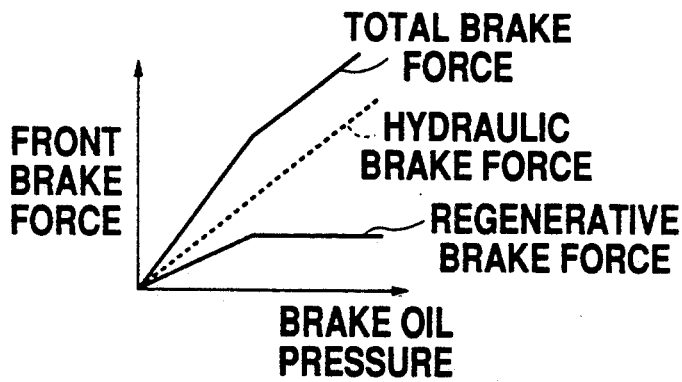

In this embodiment, when the operation at the low speed time is compared with the operation at the high speed time, it is understood that the hydraulic brake force is increased at the high speed time. That is, since the oil pressure is cut off by only the reducing valve 30 at the high speed time, the pressure difference $\Delta P$ at which the hydraulic brake starts to be effective is low, and the hydraulic brake starts to act from the time that the depression amount of the brake pedal 18 is relatively small. At the low speed time, since the oil pressure transmission between the pipings 22 and 24 is cut off by the reducing valves 30 and 42, the pressure difference $\Delta P$ at which the hydraulic brake starts to actuate is high, and thus the hydraulic brake does not start to act until the depression amount of the brake pedal 18 becomes relatively large. Hence, the unbalance at the low speed time and the high speed time as shown in FIGS. 5A and 5B can be corrected.

In this case, when the brake pedal 18 is released by the driver or when the revolution number of the motor 14 is lower than $\omega_1$, the operation is carried out in almost the same manner as the first embodiment.

As described above, in this embodiment, similarly to the first embodiment, the brake force distribution between the front and rear wheels can be optimized to prevent the early locking of the front wheels 10 and the like. Also, the unbalance at the high and low speed times can be reduced. Further, by the use of the stroke simulators 38 and 46, the feeling of physical disorder in the brake pedal stroke can be removed, and the braking feeling can be improved. Further, the reducing valves 30 and 42 can be selectively interposed on the oil pressure transmission path, and the hydraulic brake can be acted from the low pressure difference $\Delta P$ at the high speed time. Hence, the unbalance of the brake force at the high and low speed times can be removed, and the problems due to this unbalance such as the excessive braking effect at the low speed time will not be caused.

In the above-described embodiments, although the present invention has been described in connection with the electric vehicle the present invention can, of course, be applied to a hybrid vehicle provided with the motor and the engine. Further, although two reducing valves are used as the means for cutting off the oil pressure transmission, more than two reducing valves can be used depending on the regenerative characteristic.

As described above, according to the present invention, since the liquid pressure of the hydraulic brake means is cut off to perform the regenerative braking depending on the pressure difference of the reducing means, the brake force distribution can be optimized, and since the liquid amount relating to the cutoff is consumed by the liquid amount consumption means, the brake pedal stroke is stabilized to improve the braking feeling. Further, according to the present invention, since the pressure difference for the cutoff of the oil pressure transmission at the high and low speed times can be changed, the oil pressure can be adjusted corresponding to the drop of the regenerative brake force at the high speed time, and thus the problems, for example, the excessive braking effect at the low speed time and the like can be prevented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A brake control system for controlling a hydraulic brake means and a regenerative brake means mounted to an electric vehicle, the hydraulic brake means generating a hydraulic pressure in response to a braking request to mechanically brake drive wheels and idle wheels, the regenerative brake means braking the drive wheels due to a regeneration of a motor for running, the brake control system comprising:

cutoff means arranged in a hydraulic pressure transmission path to the drive wheels for cutting off a hydraulic pressure transmission when the hydraulic pressure generated by the hydraulic brake means is not greater than a predetermined value;

liquid consumption means for consuming a liquid amount corresponding to the cutoff hydraulic pressure on an opposite side to the drive wheels seen from the cutoff means when the hydraulic pressure is cut off by the cutoff means;

pressure difference detection means for detecting a pressure difference generated between a front and a rear of the cutoff means caused by the cutoff; and regenerative brake control means for obtaining a regenerative torque command value depending on the pressure difference detected by the pressure difference detection means and controlling the regenerative brake means on the basis of the obtained regenerative torque command value.

2. The system of claim 1, wherein the motor is an AC induction motor, and the regenerative brake means includes an inverter circuit for converting a DC power into an AC power to supply the AC power as a driving power to the motor, and wherein the regenerative brake control means includes means for controlling the driving power to be supplied to the motor from the inverter circuit on the basis of the regenerative torque command value.

3. The system of claim 1, wherein the hydraulic brake means includes:

hydraulic pressure generation means for generating the hydraulic pressure in response to the braking request; and hydraulic pressure action means attached to the drive wheels for applying the hydraulic pressure generated by the hydraulic pressure generation means to the drive wheels when the hydraulic pressure transmission is not cut off by the cutoff means.

4. The system of claim 3, wherein the pressure difference detection means is a sensor for detecting the pressure difference between the hydraulic pressure generated in the hydraulic pressure generation means and the hydraulic pressure in the hydraulic pressure action means.

5. The system of claim 3, wherein the cutoff means includes a reducing valve arranged in the hydraulic pressure transmission path between the hydraulic pressure generation means and the hydraulic pressure action means, the reducing valve closing to cut off the hydraulic pressure transmission path to the hydraulic pressure action means from the hydraulic pressure generation means when the pressure difference between the hydraulic pressure generated in the hydraulic pressure generation means and the hydraulic pressure in the hydraulic pressure action means is at least a predetermined valve open value, the reducing valve opening to release the hydraulic pressure transmission path to the hydraulic pressure action means from the hydraulic pressure generation means when the pressure difference between the hydraulic pressure generated in the hydraulic pressure generation means and the hydraulic pressure in the hydraulic pressure action means is greater than the predetermined valve open value.

6. The system of claim 5, wherein the liquid consumption means is a stroke simulator having almost the same liquid consumption characteristic as the hydraulic pressure action means, the stroke simulator bottoming at the valve open value of the reducing valve.

7. The system of claim 5, further comprising a check valve for holding the pressure difference between the hydraulic pressure generated in the hydraulic pressure generation means and the hydraulic pressure in the hydraulic pressure action means.

8. The system of claim 7, wherein the pressure difference detection means is a sensor for detecting the pressure difference held by the check valve.

9. The system of claim 1, further comprising request detection means for detecting the braking request, the regenerative brake control means making the regenerative torque command value to be zero in a state that the braking request is not detected.

10. The system of claim 1, wherein a regenerative brake force characteristic of the motor is a characteristic lowering a maximum regenerative brake force at a revolution speed of not greater than a predetermined low range inflection point, and the system further comprising:

revolution speed detection means for detecting the revolution speed of the motor;

compulsory communication means for by-passing the cutoff means in response to a command to remove from the hydraulic pressure transmission path to the drive wheels; and by-pass control means for giving the command to the compulsory communication means to by-pass the cutoff means when the detected revolution speed of the motor is less than the low range inflection point.

11. The system of claim 9, wherein a regenerative brake force characteristic of the motor is a characteristic lowering a maximum regenerative brake force at a revolution speed of not greater than a predetermined low range inflection point, and the system further comprising:

revolution speed detection means for detecting the revolution speed of the motor when the braking request is not detected;

compulsory communication means for by-passing the cutoff means in response to a command to remove from the hydraulic pressure transmission path to the drive wheels; and by-pass control means for giving the command to the compulsory communication means to by-pass the cutoff means when the detected revolution speed of the motor is less than the low range inflection point.

12. The system of claim 1, wherein a regenerative brake force characteristic of the motor is a characteristic lowering a maximum regenerative brake force at a revolution speed of more than a predetermined high range inflection point and becoming almost a fixed maximum regenerative brake force at the revolution speed of less than the high range inflection point, wherein a plurality of cutoff means are provided in series on the hydraulic pressure transmission path and possess cut-off pressure differences, wherein the pressure differences detected by the pressure difference detection means are the pressure differences of a front and a rear of the plurality of cutoff means connected in series, and the system further comprising communication switch means for switching communication between the plurality of cutoff means by selectively by-passing the plurality of cutoff means depending on the revolution speed of the motor, the communication switch means performing a communication switching so that only either cutoff means having a relatively low cut-off hydraulic pressure difference or cutoff means having a relatively high cut-off pressure difference is interposed in the hydraulic pressure transmission path when the revolution speed of the motor is either high or low, respectively, compared with a predetermined revolution speed set near the high range inflection point, the hydraulic pressure acting on the drive wheels due to the communication switching of the cutoff means from either a relatively low state of the hydraulic pressure at a high revolution range where the maximum regenerative brake force is lowered or a relatively high state of the hydraulic pressure at a low revolution range where the maximum regenerative brake force is relatively high.

13. The system of claim 12, wherein the hydraulic brake means includes:

hydraulic pressure generation means for generating the hydraulic pressure in response to the braking request; and hydraulic pressure action means attached to the drive wheels for applying the hydraulic pressure generated by the hydraulic pressure generation means to the drive wheels when the hydraulic pressure transmission is not cut off by the cutoff means.

14. The system of claim 13, wherein the cutoff means includes a first reducing valve arranged on the hydraulic pressure transmission path between the hydraulic pressure generation means and the hydraulic pressure action means, the first reducing valve closing to cut off the hydraulic pressure transmission path to the hydraulic pressure action means from the hydraulic pressure generation means when the pressure difference between the hydraulic pressure generated in the hydraulic pressure generation means and the hydraulic pressure in the hydraulic pressure action means is at least a predetermined valve open value, the first reducing valve opening to allow the hydraulic pressure transmission to the hydraulic pressure action means from the hydraulic pressure generation means when the pressure difference between the hydraulic pressure generated in the hydraulic pressure generation means and the hydraulic pressure in the hydraulic pressure action means is greater than the predetermined valve open value.

15. The system of claim 14, wherein the liquid consumption means includes a first stroke simulator which is provided in a hydraulic pressure generation means side seen from the first reducing value and has almost the same liquid consumption characteristic as the hydraulic pressure action means, the first stroke simulator bottoming at the value open value of the first reducing valve.

16. The system of claim 14, wherein the regenerative brake force characteristic of the motor is a characteristic lowering a maximum regenerative brake force at the revolution speed of not greater than a predetermined low range inflection point, wherein the cutoff means includes a second reducing valve to be interposed on the hydraulic pressure transmission path between the hydraulic pressure generation means and the hydraulic pressure action means in response to the command, the second reducing valve closing to cut off the hydraulic pressure transmission path to the hydraulic pressure action means from the hydraulic pressure generation means when the pressure difference between the hydraulic pressure generated in the hydraulic pressure generation means and the hydraulic pressure in the hydraulic pressure action means is at least a predetermined valve open value, the second reducing valve opening to allow the hydraulic pressure transmission to the hydraulic pressure action means from the hydraulic pressure generation means when the pressure diffrence between the hydraulic pressure generated in the hydraulic pressure generation means and the hydraulic pressure in the hydraulic pressure action means is greater than the predetermined valve open value, the valve open value of the first reducing valve corresponding to a smaller regenerative brake force that the regenerative brake force corresponding to the valve open value of the second reducing valve, and the system further comprising:

depression detection means for detecting the braking request; and revolution speed detection means for detecting the revolution speed of the motor, the communication switch means including compulsory cutoff means for interposing the second reducing value on the hydraulic pressure transmission path to the drive wheels by giving the command when the detected revolution speed of the motor is at least the low range inflection point and less than the high range inflection point.

17. The system of claim 16, wherein the communication switch means further includes:

compulsory communication means for by-passing the first reducing valve in response to a command to remove from the hydraulic pressure transmission path to the drive wheels; and by-pass control means for giving the command to the compulsory communication means to by-pass the first reducing valve when the detected revolution speed of the motor is less than the low range inflection point.

18. The system of claim 16, wherein the communication switch means further includes:

compulsory communication means for by-passing the second reducing valve in response to a command to remove from the hydraulic pressure transmission path to the drive wheels; and by-pass control means for giving the command to the compulsory communication means to by-pass the second reducing valve when the detected revolution speed of the motor is at least the high range inflection point.

19. The system of claim 16, wherein the liquid consumption means includes a second stroke simulator which is provided in a hydraulic pressure generation means side seen from the second reducing value and has almost the same liquid consumption characteristic as the hydraulic pressure action means, the second stroke simulator bottoming at the valve open value of the second reducing valve.

20. A brake control system for controlling a hydraulic brake means and a regenerative brake means mounted to an electric vehicle, the hydraulic brake means generating a hydraulic pressure in response to a braking request to mechanically brake drive wheels, the regenerative brake means braking the drive wheels due to a regeneration of a motor for running, a regenerative brake force characteristic of the motor being a characteristic lowering a maximum regenerative brake force at a revolution speed of greater than a predetermined high range inflection point and becoming an almost fixed maximum regenerative brake force at the revolution speed of less than the high range inflection point, the brake control system comprising:

a plurality of cutoff means arranged in series on a hydraulic pressure transmission path to the drive wheels for cutting off a hydraulic pressure transmission; each of the cutoff means cutting off the transmission when a difference of hydraulic pressure between a front and a rear thereof is not greater than a predetermined cut-off value; the cut-off value being set at a different value for each of the cutoff means;

pressure difference detection means for detecting a pressure difference generated between a front and a rear of the series of cutoff means by the cutoff;

regenerative brake control means for obtaining a regenerative torque command value depending on the pressure difference detected by the pressure difference detection means and controlling the regenerative brake means on the basis of the obtained regenerative torque command value; and path switch means for switching path between the plurality of cutoff means by selectively by-passing the plurality of cutoff means depending on the revolution speed of the motor, the path switch means performing a path switching so that only either the cutoff means having a relatively low cut-off hydraulic pressure or the cutoff means having a relatively high cut-off pressure difference is interposed on the hydraulic pressure transmission path when the revolution speed of the motor is either high or low, respectively, compared with a predetermined revolution speed set near the high range inflection point, the hydraulic pressure acting on the drive wheels due to the path switching of the cutoff means from either a relatively low state of the hydraulic pressure at a high revolution range where the maximum regenerative brake force is lowered or a relatively high state of the hydraulic pressure at a low revolution range where the maximum regenerative brake force is relatively high.

* * * * *